United States Patent
Mahvi

(10) Patent No.: US 9,197,362 B2
(45) Date of Patent: Nov. 24, 2015

(54) GLOBAL STATE SYNCHRONIZATION FOR SECURELY MANAGED ASYMMETRIC NETWORK COMMUNICATION

(71) Applicant: Mehdi Mahvi, Irvine, CA (US)

(72) Inventor: Mehdi Mahvi, Irvine, CA (US)

(*) Notice: Subject to any disclaimer, the term of this patent is extended or adjusted under 35 U.S.C. 154(b) by 75 days.

(21) Appl. No.: 14/217,251

(22) Filed: Mar. 17, 2014

(65) Prior Publication Data
US 2014/0286358 A1  Sep. 25, 2014

Related U.S. Application Data

(60) Provisional application No. 61/801,582, filed on Mar. 15, 2013.

(51) Int. Cl.
*H04L 12/28* (2006.01)
*H04J 3/06* (2006.01)
(Continued)

(52) U.S. Cl.
CPC .......... *H04L 1/0045* (2013.01); *H04L 63/1458* (2013.01)

(58) Field of Classification Search
CPC ........... H04L 1/00; H04L 1/0045; H04L 7/00; H04L 7/0008; H04L 29/06877; H04L 29/06884; H04L 29/06891; H04L 29/06897; H04L 29/06904; H04L 29/06911; H04L 63/02; H04L 63/0218; H04L 63/0227; H04L 63/0254; H04L 63/0263; H04L 63/08; H04L 63/14; H04L 63/20; H04L 63/145; H04L 63/1408; H04L 63/1416; H04L 63/1425; H04L 63/1433; H04L 63/1441; H04L 63/1458; H04L 63/1466; H04L 69/16; H04L 69/161; H04L 41/0893; H04L 45/32; H04L 47/10–47/12; H04L 47/20; H04L 47/127; H04L 47/193; H04L 2463/141; H04L 2463/146; G06F 21/00; G06F 21/55; G06F 21/554; G06F 21/566; G06F 21/577; H04W 12/02; H04W 12/04; H04W 12/06; H04W 12/08; H04W 12/12

USPC .................... 370/229–238, 395.52, 400–401, 370/487–488, 497; 709/223–229, 235; 713/153, 154; 726/11–14, 22, 23

See application file for complete search history.

(56) References Cited

U.S. PATENT DOCUMENTS 6,725,378 B1 * 4/2004 Schuba et al. .................. 726/13
7,020,783 B2   3/2006 Vange et al.
(Continued)

FOREIGN PATENT DOCUMENTS

EP    1691529 A1   8/2006
EP    1705863 A1   9/2006
(Continued)

*Primary Examiner* — Tri H Phan
(74) *Attorney, Agent, or Firm* — San Diego IP Law Group LLP

(57) ABSTRACT

The present invention provides a system and method is disclosed for the development and maintenance of a globally distributed state session table wherein a plurality of client connections from one network are stored in a plurality of computer systems to track the aforementioned connection to one or more secondary networks. Client connection requests may originate anywhere on the Internet and server responses to such client requests may be sent asymmetrically from any other point on the Internet. The client-server connection is secured utilizing an intermediary device that acts as a transparent relay, generating a secret cookie hash for the client, such that only the data packets containing such hash are forwarded by the globally distributed system to the server.

12 Claims, 1 Drawing Sheet

(51) Int. Cl.
  *G06F 15/177* (2006.01)
  *G08B 29/00* (2006.01)
  *H04L 1/00* (2006.01)
  *H04L 29/06* (2006.01)

(56) References Cited

U.S. PATENT DOCUMENTS

| | | |
|---|---|---|
| 7,043,759 B2 | 5/2006 | Kaashoek et al. |
| 7,415,723 B2 * | 8/2008 | Pandya ............................ 726/13 |
| 7,478,429 B2 | 1/2009 | Lyon |
| 7,657,628 B1 * | 2/2010 | McDysan et al. ............. 709/225 |
| 7,779,071 B2 * | 8/2010 | Lor et al. ....................... 709/203 |
| 7,797,738 B1 | 9/2010 | Spatscheck et al. |
| 7,921,462 B2 | 4/2011 | Rooney et al. |
| 8,225,399 B1 | 7/2012 | Van der Merwe |
| 8,370,937 B2 | 2/2013 | Gal et al. |
| 8,826,413 B2 * | 9/2014 | Vijayakumar et al. .......... 726/13 |
| 8,838,752 B2 * | 9/2014 | Lor et al. ....................... 709/220 |
| 8,978,138 B2 * | 3/2015 | Mahvi .............................. 726/23 |
| 2002/0032871 A1 | 3/2002 | Malan et al. |
| 2002/0083175 A1 | 6/2002 | Afek et al. |
| 2002/0101819 A1 | 8/2002 | Goldstone |
| 2002/0103916 A1 | 8/2002 | Chen et al. |
| 2002/0120853 A1 | 8/2002 | Tyree |
| 2003/0014665 A1 | 1/2003 | Anderson et al. |
| 2003/0145232 A1 | 7/2003 | Poletto et al. |
| 2003/0145233 A1 | 7/2003 | Poletto et al. |
| 2003/0226032 A1 | 12/2003 | Robert |
| 2003/0236999 A1 | 12/2003 | Brustoloni |
| 2004/0008681 A1 | 1/2004 | Govindarajan et al. |
| 2005/0108518 A1 * | 5/2005 | Pandya ........................ 713/151 |
| 2006/0010389 A1 | 1/2006 | Rooney et al. |
| 2012/0260337 A1 | 10/2012 | Van der Merwe |
| 2013/0042322 A1 | 2/2013 | Yoon |

FOREIGN PATENT DOCUMENTS

| | | |
|---|---|---|
| EP | 2161898 A1 | 3/2010 |
| EP | 2257024 B1 | 7/2012 |

* cited by examiner

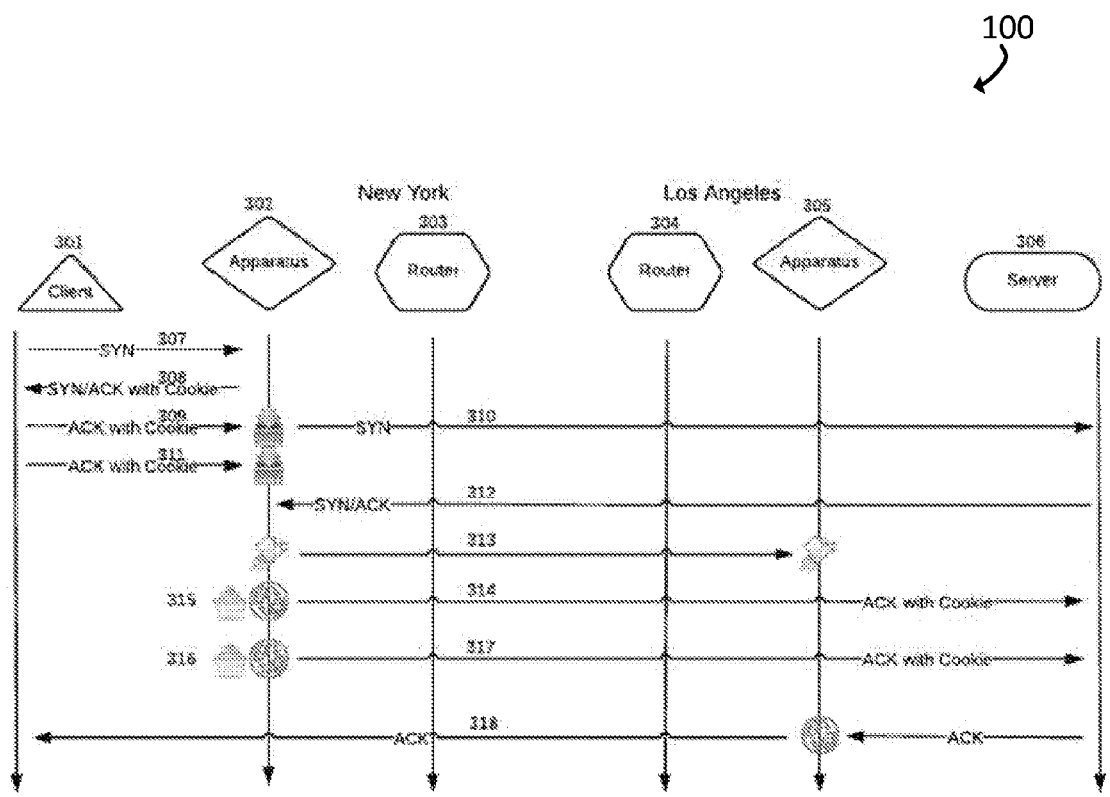

GLOBAL STATE SYNCHRONIZATION FOR SECURELY MANAGED ASYMMETRIC NETWORK COMMUNICATION

CROSS-REFERENCE TO RELATED APPLICATION

The present application claims priority to U.S. Provisional Patent Application No. 61/801,582, filed Mar. 15, 2013, and entitled "Global State Synchronization for Securely Managed Asymmetric Network Communication," the entire disclosure of which is incorporated by reference herein.

BACKGROUND OF THE INVENTION

1. Field of Invention

The invention relates generally to data network communications and more particularly to a technique for high performance asymmetric network communication and thwarting network based attacks, such a denial-of-service attack.

2. Description of Related Art

In computing, a denial-of-service attack is an attempt to make a machine or network resource unavailable to its intended users. One common method of attack is to overload the server. This involves saturating the target machine with external communications requests so it cannot respond to legitimate traffic or responds so slowly that it is basically unavailable.

In general terms, a denial of service attack is implemented by either forcing the targeted computer(s) to reset, or consuming its resources so that it can no longer provide its intended service or obstructing the communication media between the intended users and the victim(s) so that they can no longer communicate adequately. Denial of service attacks are generally used relating to computer networks, but is not limited to this field; for example, it is also used in reference to CPU resource management.

Denial-of-service attacks violate the acceptable use policies of Internet service providers and are illegal. The motives generally include temporary or indefinite interruption or suspension of services of a host connected to the Internet. Targets typically include high-profile web servers such as banks and credit card payment gateways.

In a traditional transmission control protocol (TCP) 3-way handshake, an initial packet with a TCP bit flag SYN is generated from a client to a server. A plurality of intermediary routing and switching devices assure the delivery of the data packet from the client to the server, and vice versa. The server generates a response packet with the TCP bit flags SYN and ACK set. The client then responds with a TCP ACK packet, establishing a completed TCP session.

Upon generation of the initial TCP SYN packet from the client, the server reserves and allocates a predetermined quantity of system resources, including processor, ram, and/or disk for the facilitation of this connection. The server maintains these resources for a predetermined period of time often as long as several minutes. As computer systems have limited resources, an attacker can take advantage of this situation by generating a large quantity of SYN packets to the server, exhausting all system resources. The server will then become unresponsive to legitimate client requests, thus denying service to legitimate clients. This is one embodiment of a "denial of service" attack.

To mitigate these, a number of systems have been designed that may have met needs at one point in time, but are incapable of meeting the current demands of high performance asymmetric network communication as well as complex distributed attacks. These systems lack the performance and the technology necessary to provide successful mitigation of large-scale attacks. The majority of these prior art systems simply "detect" denial of service conditions, but do not actually mitigate this undesirable situation.

When asymmetric routing is in place, a data packet originated by a client may arrive in New York, destined for a server in Los Angeles. The response packet from the server would then be transmitted from Los Angeles to the Internet. The intermediary system in Los Angeles would prohibit the data packet from leaving the network as it would not be a validated data packet. Conversely, the intermediary system in New York would prohibit further inbound communication as the communication was never completed.

Prior art systems do not provide a mechanism for global state management of session state to solve challenges met during global distribution of these monitoring and mitigation systems. They describe an overview process of transmitting control messages to other intermediary systems, but do not provide reduced steps to produce such a global system. They further describe systems for securely establishing secure communication utilizing hash cookies, but do not describe this process in a manner that is usable in today's Internet environment.

SUMMARY OF THE INVENTION

Whereas conventional systems simply "detect" denial of service condition, and do not actual mitigation or resolve this undesirable situation, embodiments of the present invention solve this problem by incorporating a method to securely establish connectivity between a client and a server in a globally distributed asymmetric network. For example, a system in Los Angeles, would communicate with a system in New York, and generate messages between the two systems that communicate the state of sessions. Thus communication is able to secure take place between the client and the server in an asymmetric fashion.

In an embodiment of the invention, a computer-implemented method for global state synchronization in a communications session over a network utilizing transmission control protocol (TCP) comprises: receiving a first SYN packet from source address A1 to destination address A2, wherein source address A1 refers to a client and destination address A2 refers to a server providing resources desired by the client; sending a first SYN/ACK packet to the client; receiving a first ACK packet from the client; storing the first ACK packet; sending a second SYN packet to the server, wherein a source address of the second SYN packet is source address A1; receiving a second SYN/ACK packet from the server; sharing state session information with a remote network apparatus; and sending the stored first ACK packet to the server. The SYN/ACK packet comprises a first cookie. The step of storing the first ACK packet comprises the steps of applying a hash function to the first ACK packet and queuing the first ACK packet. The network apparatus translates outbound packets from the server. The first ACK packet comprises a second cookie. The step of sending the stored first ACK packet comprises the step of dequeuing the first ACK packet. The step of receiving a response ACK packet from the server and destined for the client, and translating the received response ACK packet so that the client receives the proper sequence and acknowledgement numbers for the communication session.

In another embodiment of the invention, a system for global state synchronization in a communications session over a network utilizing transmission control protocol (TCP) comprises: a first processor configured to: receive a first SYN packet from source address A1 to destination address A2, wherein source address A1 refers to a client and destination address A2 refers to a server providing resources desired by the client, send a first SYN/ACK packet to the client, receive a first ACK packet from the client, store the first ACK packet, send a second SYN packet to the server, wherein a source address of the second SYN packet is source address A1, receive a second SYN/ACK packet from the server, share state session information with a second processor, and send the stored first ACK packet to the server; and the second processor configured to: receive the state session information shared by the first processor, receive a response ACK packet from the server and destined for the client, and translate the response ACK packet so that the client receives the proper sequence and acknowledgment numbers for the communications session.

Embodiments of the present invention solve the problem of the potential overload condition on the server wherein illegitimate clients can flood the server, as well as the scalability and performance problem wherein a complex system can be deployed around the world to increase the overall mitigation capacity of a security system. It meets the stringent demands of today's Internet.

An ideal embodiment of this system relates to the defense of network denial of service attacks, although other embodiments include network intrusions and other network-based attacks, targeting one or more of a plurality of systems on a network, such as the Internet.

Systems that undergo various forms of network-based attacks must be defended utilizing comprehensive intermediary systems. These systems can be isolated to a single location, or distributed across the Internet. Simply distributing these systems without a set of processes governing their behavior will result in subpar performance or in some cases, inconsistent connectivity between clients and servers due to network asymmetry.

Embodiments of the invention provide high asymmetry performance network communication. Network Asymmetry can be defined as a condition wherein a data packet arrives on one network port from a source address P1 on a network N1, destined to a destination address P2 on a network N2 while a data packet leaving N2 utilizing source address P2 destined for a destination address P1 on network N1 traverses a different port.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows:

FIG. 1 illustrates a process flow diagram of a system according to an embodiment of the invention.

DETAILED DESCRIPTION OF EMBODIMENTS

Further features and advantages of the invention, as well as the structure and operation of various embodiments of the invention, are described in detail below with reference to the accompanying FIG. 1. Although the present invention is described in terms of stopped denial-of-service attack attacks, embodiment of the present invention prevent other network intrusions and network based attacks.

Further, although this invention is described in terms of computer, the internet, and specific locations, this invention can be used in any instance wherein information needs to be shared between two apparatuses that control and regulate the flow of communication between point A and point B, where the path of communication between the two locations is asymmetric and the communication has some form of sequencing associated with it to guarantee the validity of the communication. For example, this implementation can take place in "TCP validation via systematic transmission regulation and regeneration."

The present invention defends against network denial of service attacks, network intrusions, and other network-based attacks, targeting one or more of a plurality of systems on a network, such as the Internet. Systems that undergo various forms of network-based attacks must be defended utilizing comprehensive intermediary systems. These systems can be isolated to a single location, or distributed across the Internet.

FIG. 1 illustrates a process flow diagram of a system 100 according to an embodiment of the invention. The system 100 includes a client 301, an apparatus 302, a router 303, a router 304, an apparatus 305, and a server 306. This software system 100 resides on a computer system and is defined as an apparatus or set of apparatuses.

The system 100, at a high level, include two networks in disjoint locations with asymmetric network communication, where the client 301 transmits packets via location A (e.g., New York), location A relays this communication to location B (e.g., Los Angeles), location B responds to this communication directly to client, and the communication is asymmetric because location A has a distinct set of Internet pipes from location B. The path of ingress for communication in location A is distinct from the path of egress for communication in location B.

The client 301 performs connection requests which may originate anywhere on the Internet and server responses to such client requests may be sent asymmetrically from any other point on the Internet.

Apparatuses 302, 305 can, through some mechanism receive network traffic and transmit network traffic. This mechanism can, for example, be direct memory access into a network interface card with visibility and access into a network. The apparatus then has the ability to view traffic and transmit traffic. The network traffic that is passed through the apparatus comprises all network traffic that is desired to be securely managed. This can include all network traffic or a particular subset off network traffic such as network traffic destined to a particular subsection of the network. When such network traffic is passed through the apparatus, such network traffic is no longer passed through the standard pathway on the network. Network traffic can originate in any point of presence that the service provider or content provider resides.

As described in FIG. 1, apparatus 302, upon receipt of a TCP SYN packet 307 from source address A1 on client 301 to destination address A2, wherein address A2 resides on the server 306 providing resources desired by client 301, responds to client 301.

The server 306 responds to the client 302 with the following details. The server 306 changes the source address of the TCP SYN/ACK packet to be A2. The server 306 sets the TCP SYN/ACK sequence number to cookie hash, encoding required fields into the hash for later retrieval. The server 306 manipulates source and destination Ethernet header of the outgoing packet to facilitate it leaving the network through the appropriate network port. The apparatus 302, or another intermediary system (e.g., router 303), prevents the TCP SYN packet 307 from arriving at its ultimate destination, which is the server 306 providing the resources requested by the client. The apparatus 302 transmits packet 308 to the client 301.

Upon receipt of the TCP SYN/ACK packet 308 from apparatus 302, the client 301 responds to server 306 with address A2 from client 301 address A1, with one or more packets, often comprising packets 309 and 311 with the TCP ACK flag set. Upon receipt of these, the apparatus 302 queues such packets into a memory system utilizing a hash function. This hash function can be any hash function, the identification and implementation of which is apparent to one of ordinary skill in the art, based on performance requirements of system implementer or operator.

The apparatus 302 or another intermediary system prevents the packet 309 (or packets 309 and 311) from arriving at their ultimate destination, the server 306 providing the resources requested by the client 301. The apparatus 302 then sends a TCP SYN packet 310, manipulating the source of the communication to reflect client 301 address A1. The destination for this packet 301 is server 306.

The server 306 then replies to client 301, really apparatus 302, with a TCP SYN/ACK packet 312 in the normal fashion as governed by TCP communication. Upon receipt of this TCP SYN/ACK packet 312, the apparatus 302 is signaled 313 to share its state session information with apparatus 305. The apparatus 305 is now aware of state session information for this communication and can commence translation on future outbound packets from server 306. Upon receipt of this TCP SYN/ACK packet 312, the apparatus 302 is signaled to dequeue its TCP ACK with cookie packets 315 and 316 and transmit these packets 314 and 317 to the server 306.

The server 306 replies to the received TCP ACK packets with a response TCP ACK packet 318. The apparatus 305 translates this communication so that the client 301 receives the proper TCP sequence and acknowledgment numbers for the communication.

This system 100 is currently in production and operation on a service provide network in two locations, Los Angeles and New York. The system operates without flaw for all tested applications. The network that this system is implemented on is similar in design and philosophy to the network displayed in FIG. 1.

Performance for this system 100 is linearly scalable based on the number of apparatuses in operation in the different locations, as well as the minimum amount of computer memory allocated to each system. The maximum number of state sessions that can be maintained globally is equal to the maximum number of state sessions that can be maintained in any one location. This is due to the requirement of full state session sharing across all nodes to avoid the problems that exist in conventional systems.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method for global state synchronization in a communications session over a network utilizing transmission control protocol (TCP), the method implemented on a processor and comprising the steps of:
   receiving a first SYN packet from source address A1 to destination address A2, wherein source address A1 refers to a client and destination address A2 refers to a server providing resources desired by the client;
   sending a first SYN/ACK packet to the client;
   receiving a first ACK packet from the client;
   storing the first ACK packet;
   sending a second SYN packet to the server, wherein a source address of the second SYN packet is source address A1;
   receiving a second SYN/ACK packet from the server;
   sharing state session information with a remote network apparatus; and
   sending the stored first ACK packet to the server.

2. The method of claim 1, wherein the SYN/ACK packet comprises a first cookie.

3. The method of claim 1, wherein the step of storing the first ACK packet comprises the steps of applying a hash function to the first ACK packet and queuing the first ACK packet.

4. The method of claim 3, wherein the first ACK packet comprises a second cookie.

5. The method of claim 4, wherein the step of sending the stored first ACK packet comprises the step of dequeuing the first ACK packet.

6. The method of claim 1, wherein the network apparatus translates outbound packets from the server.

7. The method of claim 6, further comprising the step of receiving a response ACK packet from the server and destined for the client, and translating the received response ACK packet so that the client receives the proper sequence and acknowledgement numbers for the communication session.

8. A system for global state synchronization in a communications session over a network utilizing transmission control protocol (TCP), the system comprising:
   a first processor configured to:
      receive a first SYN packet from source address A1 to destination address A2, wherein source address A1 refers to a client and destination address A2 refers to a server providing resources desired by the client,
      send a first SYN/ACK packet to the client,
      receive a first ACK packet from the client,
      store the first ACK packet,
      send a second SYN packet to the server, wherein a source address of the second SYN packet is source address A1,
      receive a second SYN/ACK packet from the server,
      share state session information with a second processor, and
      send the stored first ACK packet to the server; and
   the second processor configured to:
      receive the state session information shared by the first processor,
      receive a response ACK packet from the server and destined for the client, and
      translate the response ACK packet so that the client receives the proper sequence and acknowledgment numbers for the communications session.

9. The system of claim 8, wherein the SYN/ACK packet comprises a first cookie.

10. The system of claim 8, wherein the first processor is further configured to apply a hash function to the first ACK packet and queue the first ACK packet.

11. The system of claim 10, wherein the first ACK packet comprises a second cookie.

12. The system of claim 11, wherein the first processor is further configured to dequeue the first ACK packet.

* * * * *